(12) United States Patent
Murayama (10) Patent No.: US 7,956,886 B2
(45) Date of Patent: Jun. 7, 2011

(54) MULTI-EYE IMAGE PICKUP APPARATUS AND ADJUSTING METHOD

(75) Inventor: Jin Murayama, Tokyo (JP)

(73) Assignee: Fujifilm Corporation, Tokyo (JP)

( * ) Notice: Subject to any disclaimer, the term of this patent is extended or adjusted under 35 U.S.C. 154(b) by 579 days.

(21) Appl. No.: 12/126,659

(22) Filed: May 23, 2008

(65) Prior Publication Data
US 2009/0015689 A1    Jan. 15, 2009

(30) Foreign Application Priority Data

Jul. 9, 2007 (JP) .................. 2007-179719

(51) Int. Cl.
*H04N 13/00* (2006.01)
*H04N 13/02* (2006.01)
*H04N 9/73* (2006.01)
*H04N 5/235* (2006.01)

(52) U.S. Cl. ....... 348/42; 348/47; 348/223.1; 348/229.1

(58) Field of Classification Search .................. 348/42, 348/46, 48, 51, 52, 53, 207.99, 222.1, 223.1, 348/224.1, 229.1, 230.1, 234, 333.01, 333.02; 396/322, 324, 325, 326, 327, 333, 334
See application file for complete search history.

(56) References Cited

U.S. PATENT DOCUMENTS

| | | | | |
|---|---|---|---|---|
| 6,256,062 B1* | 7/2001 | Endo | .......... | 348/223.1 |
| 6,987,534 B1* | 1/2006 | Seta | .......... | 348/229.1 |
| 7,162,074 B2 | 1/2007 | Shibayama et al. | | |
| 2003/0095178 A1* | 5/2003 | Shibayama | .......... | 348/46 |
| 2004/0145655 A1* | 7/2004 | Tomita | .......... | 348/51 |

FOREIGN PATENT DOCUMENTS

| JP | 3587506 B2 | 8/2004 |
|---|---|---|
| JP | 3833930 B2 | 7/2006 |

* cited by examiner

*Primary Examiner* — David L Ometz
*Assistant Examiner* — Peter Chon
(74) *Attorney, Agent, or Firm* — Birch, Stewart, Kolasch & Birch, LLP (57) ABSTRACT

A stereoscopic camera includes a master camera for photoelectric conversion of object light to generate a first image signal with three color components G, R and B. A slave camera generates a second image signal. In an adjusting method, a first gain Dmr, Dmg and Dmb of the color components is determined according to the first image signal to correct a brightness level and white balance of the master camera, to adjust the first image signal by use thereof. A second gain Dsr, Dsg and Dsb of the color components is determined according to the first gain and color calibration information predetermined according to color sensitivity of the master and slave cameras in relation to the color components. The second image signal is adjusted by use thereof, for color matching between the first and second image signals to set equal the brightness level and the white balance.

14 Claims, 4 Drawing Sheets

MULTI-EYE IMAGE PICKUP APPARATUS AND ADJUSTING METHOD

BACKGROUND OF THE INVENTION

1. Field of the Invention

The present invention relates to a multi-eye image pickup apparatus and adjusting method. More particularly, the present invention relates to a multi-eye image pickup apparatus and adjusting method in which a brightness level and white balance of image pickup assemblies can be adjusted suitably.

2. Description Related to the Prior Art

An image pickup apparatus includes a CCD or image sensor known in the field of imaging. In the image pickup apparatus, a brightness level is adjusted in consideration of brightness of an object. Also, the white balance is adjusted to adjust color balance of an image according to a type of a light source and color temperature of light from the light source.

There is a multi-eye image pickup apparatus in which two image pickup assemblies are disposed to pick up two images with disparity by use of image sensors. It is possible to record a stereoscopic set of images with disparity. Also, distance information of various portions of an object can be retrieved according to triangulation, which is useful in the image recognition with high precision in consideration fine unevenness and the like.

It is preferable to set the brightness level equal between image pickup assemblies in the multi-eye image pickup apparatus. U.S. Pat. No. 6,987,534 (corresponding to JP-B 3587506) discloses a structure for minimizing a difference in the brightness level of images picked up by the first and second cameras. Specifically, a window for evaluation in a reference image picked up by the first camera is positioned at an overlapped portion of the images. Also, a window for evaluation in a comparison image picked up by the second camera is positioned at the overlapped portion. A gain for amplifying an image signal output by the second camera is adjusted to increase or decrease according to the positive or negative state of the difference of the average brightness in the evaluation windows.

U.S. Pat. No. 7,162,074 (corresponding to JP-B 3833930) discloses a multi-eye image pickup apparatus in which a plurality of pairs of samples of brightness values are obtained from the evaluation windows determined in the manner of U.S. Pat. No. 6,987,534 (corresponding to JP-B 3587506). Again for amplifying the image signal and black level are adjusted to minimize a difference in the evaluation values constituting the pairs of samples. This results in setting equal the brightness level between the image pickup assemblies.

In the multi-eye image pickup apparatus, a response of the brightness level in a rapid manner is required in relation to a change in a light source or object in a manner similar to the image pickup apparatus. In the method of U.S. Pat. No. 6,987,534 (corresponding to JP-B 3587506), the gain is changed stepwise until the average brightness becomes equal between the evaluation windows. Even when the brightness level is adjusted by quick response or the first camera to the change in the light source of object, a considerable delay occurs until the brightness level of the second camera becomes sufficiently high. The average brightness obtained from the brightness of plural recorded images are used for evaluation. The brightness level is adjusted slowly for an abrupt change in the object brightness. Inequality in the brightness level continues for a considerable time. In U.S. Pat. No. 7,162,074 (corresponding to JP-B 3833930), plural samples are required for adjusting the brightness level and black level, so that no quick response is expected. Also, it is necessary to set equal the white balance in addition to the brightness level.

SUMMARY OF THE INVENTION

In view of the foregoing problems, an object of the present invention is to provide a multi-eye image pickup apparatus and adjusting method in which a brightness level and white balance of image pickup assemblies can be adjusted suitably.

In order to achieve the above and other objects and advantages of this invention, a multi-eye image pickup apparatus is provided, including a first image pickup assembly having a first image sensor for photoelectric conversion of object light to generate a first image signal with plural color components, and at least one second image pickup assembly having a second image sensor for photoelectric conversion of the object light to generate a second image signal with plural color components. The multi-eye image pickup apparatus includes a memory for storing color calibration information defined in association with color sensitivity of the first and second image sensors for the plural color components. A first corrector adjusts the first image signal for respectively the plural color components, to correct a brightness level and white balance. A second corrector adjusts the second image signal for respectively the plural color components, to correct a brightness level and white balance. A first gain setting unit determines a first gain according to the first image signal, and assigns the first corrector therewith. A second gain setting unit determines a second gain according to the first gain and the color calibration information, and assigns the second corrector therewith, to set equal the brightness level and the white balance between the first and second image signals.

The second gain setting unit assigns the second gain in synchronism with assignment of the first gain by the first gain setting unit.

Furthermore, a first amplifier amplifies the first image signal between the first image sensor and the first corrector, to correct a brightness level thereof. A second amplifier amplifies the second image signal between the second image sensor and the second corrector, to correct a brightness level thereof. A third gain setting unit determines a third gain according to the first image signal, to assign the first amplifier with the third gain. A fourth gain setting unit determines a fourth gain according to the third gain, to assign the second amplifier with the fourth gain.

The first and second gain setting units assign the first and second gains in a frame period after the third and fourth gain setting units assign the third and fourth gains.

The color calibration information is predetermined by image pickup of one test object with the first and second image pickup assemblies in an equal measuring condition.

The color calibration information is constituted by a relative sensitivity value of a first color of colors of the plural color components, and a ratio of a relative sensitivity value of colors other than the first color to the relative sensitivity value of the first color for each of the first and second image pickup assemblies.

The color calibration information is constituted by a ratio of a relative sensitivity value of the first image pickup assembly to a relative sensitivity value of the second image pickup assembly for respectively the plural color components, and the first gain is multiplied by the ratio to determine the second gain.

In a preferred embodiment, an adjusting method of adjusting a multi-eye image pickup apparatus is provided, the multi-eye image pickup apparatus including a first image pickup assembly for photoelectric conversion of object light to generate a first image signal with plural color components, and at least one second image pickup assembly for photoelectric conversion of the object light to generate a second image signal with plural color components. In the adjusting method, a first gain of the plural color components is determined according to the first image signal to correct a brightness level and white balance of the first image pickup assembly, to adjust the first image signal by use thereof. A second gain of the plural color components is determined according to the first gain and color calibration information predetermined according to color sensitivity of the first and second image pickup assemblies in relation to the plural color components, to adjust the second image signal by use thereof, for color matching between the first and second image signals to set equal the brightness level and the white balance.

Also, a computer executable program for adjusting a multi-eye image pickup apparatus is provided, the multi-eye image pickup apparatus including a first image pickup assembly for photoelectric conversion of object light to generate a first image signal with plural color components, and at least one second image pickup assembly for photoelectric conversion of the object light to generate a second image signal with plural color components. The computer executable program includes a determining program code for determining a first gain of the plural color components according to the first image signal to correct a brightness level and white balance of the first image pickup assembly, to adjust the first image signal by use thereof. There is a determining program code for determining a second gain of the plural color components according to the first gain and color calibration information predetermined according to color sensitivity of the first and second image pickup assemblies in relation to the plural color components, to adjust the second image signal by use thereof, for color matching between the first and second image signals to set equal the brightness level and the white balance.

Consequently, a brightness level and white balance of image pickup assemblies can be adjusted suitably in the multi-eye image pickup apparatus, because a second gain for an amplifier in the second image pickup assembly is determined according to the imaging sensitivity and a first gain for an amplifier in the first image pickup assembly.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENT(S) OF THE PRESENT INVENTION

Figure 1:
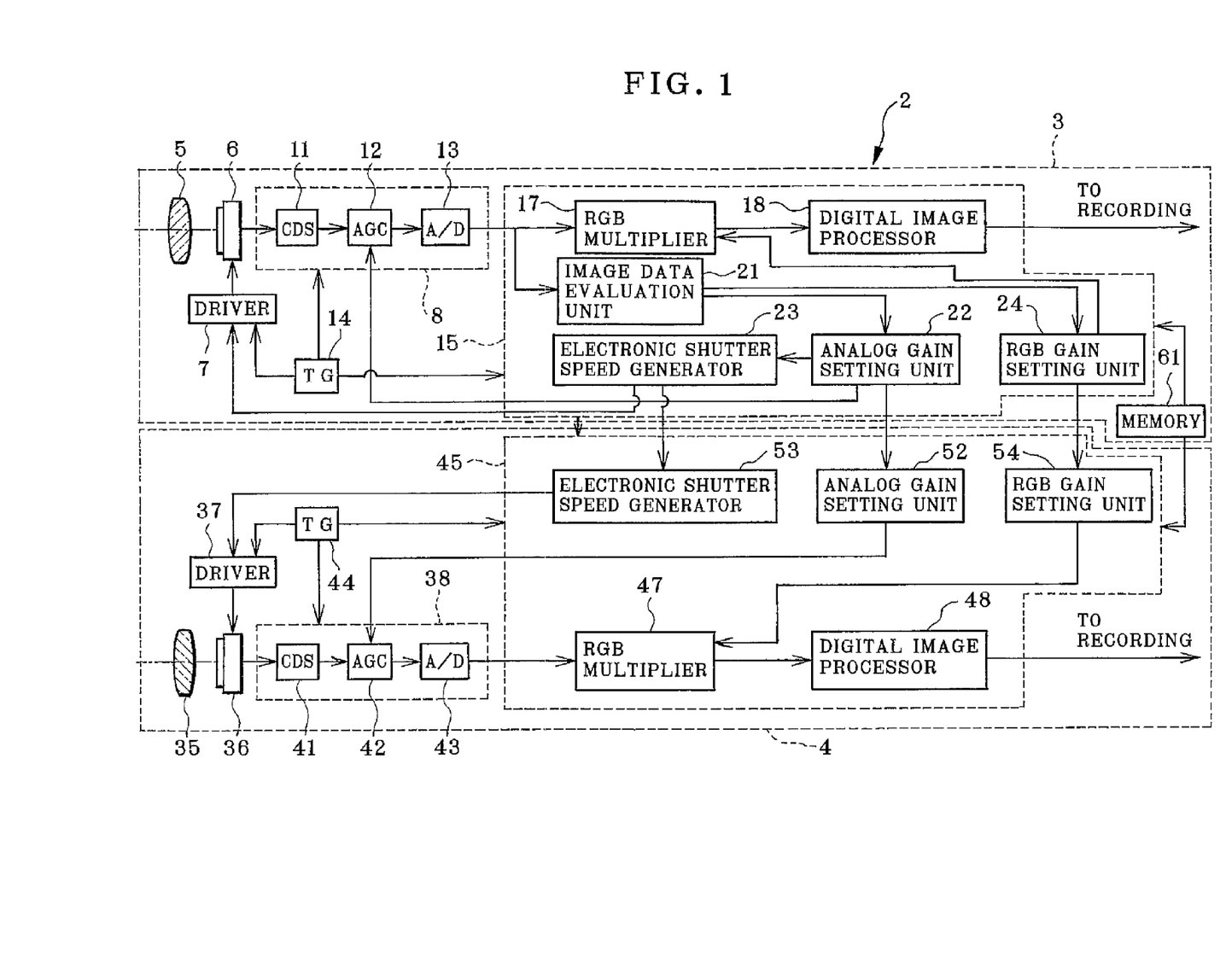
FIG. 1 is a block diagram schematically illustrating a stereoscopic camera as multi-eye image pickup apparatus.

In FIG. 1, a stereoscopic camera 2 as a multi-eye image pickup apparatus is illustrated. The stereoscopic camera 2 is constituted by a master camera 3 as main image pickup assembly and a slave camera 4 as auxiliary image pickup assembly, and photographs a motion image with disparity.

The master and slave cameras 3 and 4 have optical axes parallel to one another, and pick up an image of the same scene.

The master camera 3 includes a lens system 5 and a CCD image sensor 6. The lens system 5 passes object light, and forms an image of an object on the CCD 6. Examples of the lens system 5 include a lens system with a fixed focal length, zoom lens system and the like known in the field of the lens. Also, the lens system 5 may be any one of types including a type of a fixed focal point, a focus adjustable type, and an autofocus type in which an object can be focused automatically.

The CCD 6 has a great number of photo receptors as elements on its reception surface. Color filters of primary colors of red, green and blue are disposed for the photo receptors with predetermined spectral characteristics. The CCD 6 as single device picks up a color image by color separation of object light in the primary colors. The image sensor may be an MOS image sensor instead of the CCD image sensor. A color filter for the CCD 6 may be a complementary color filter with which object light is separated into cyan, magenta and yellow colors as complementary colors. Also, plural image sensors may be used for respectively the primary colors.

A driver 7 drives the CCD 6, and outputs an analog image signal by photoelectric conversion of an object image. The CCD 6 has a structure of an electronic shutter in which time of storing the charge is adjusted, to adjust exposure time. For the adjustment of the electronic shutter speed, a parameter is assigned to the driver 7.

An AFE (analog front end) circuit 8 is supplied with an analog image signal from the CCD 6. The AFE 8 is constituted by a correlated double sampling circuit (CDS) 11, an auto gain control circuit (AGC) 12 and an A/D converter 13. The CDS 11 processes the analog image signal by correlated double sampling, and removes a reset noise component created upon conversion of the charge into the analog image signal.

The AGC 12 is an amplifier for amplifying the analog image signal. An analog gain Am is assigned to the AGC 12 as will be described later. The analog gain Am is used to adjust the brightness level regarding the analog image signal. The analog image signal, which is a color component of a signal of each one of the red, green and blue for pixels, is amplified with the analog gain Am in an equal manner between the colors in the AGC 12. The A/D converter 13 converts the analog image signal from the AGC 12 into image data of a digital form.

A timing generator (TG) 14 generates a drive signal, which causes the driver 7 to drive the CCD 6. Also, the timing generator 14 generates a timing pulse for use in the CDS 11 and the A/D converter 13, and a timing pulse for driving the CCD 6 and various other elements, in a manner of a pixel clock for use in a digital signal processor (DSP) 15, V/H start timing, and the like.

The image data from the A/D converter 13 is input to the digital signal processor 15. Blocks in the digital signal processor 15 are schematically illustrated in the drawing. The digital signal processor 15 performs tasks of adjusting the brightness level and white balance, determining parameters for the adjustment, and gamma correction and other image processing.

An RGB multiplier 17 multiplies image data of each color by a digital gain as a predetermined coefficient for the color, to adjust the brightness finely and adjust the white balance. The RGB multiplier 17 is combined with the AGC 12 as a corrector for adjusting brightness. The RGB multiplier 17 multiplies a red component of the image data by the digital gain Dmr, a green component by the digital gain Dmg, and a blue component by the digital gain Dmb. The components of the image data are data amplified by the digital gain of the color corresponding to the analog gain Am.

A digital image processor 18 processes the image data from the RGB multiplier 17 by the gamma correction, edge enhancement, Y/C separation and other image processing. In the Y/C separation, the image data of the primary colors of red, green and blue is converted into a combination of a luminance signal Y and chrominance signals Cr and Cb. Interpolation is also carried out by the digital image processor 18 if required according to arrangement of pixels in the CCD 6. The processed image data from the digital image processor 18 is output by the master camera 3, which writes the image data of images to a recording medium or data storage.

An image data evaluation unit 21 determines an evaluation value for a brightness level and white balance. When image data is obtained within an evaluation region in an image frame, the image data evaluation unit 21 classifies and adds up portions of image data for the primary colors, and determines a red evaluation value Ir as a sum of a signal level of red, a green evaluation value Ig as a sum of a signal level of green, a blue evaluation value Ib as a sum of a signal level of blue.

An analog gain setting unit 22 evaluates the evaluation value Ig of green to determine the analog gain Am, and assigns the same to the AGC 12. Specifically, the analog gain setting unit 22 selects a value of the analog gain Am to minimize a difference of the evaluation value Ig of green from the target value Ig of green predetermined as target of the evaluation value Ig for the purpose of determining the analog gain Am.

An electronic shutter speed generator 23 assigns the driver 7 with a predetermined electronic shutter speed. Note that the electronic shutter speed may be not fixed but variable according to brightness of an object in a manner similar to the analog gain Am. Also, an aperture stop mechanism may be disposed. An aperture value of the aperture stop mechanism may be adjusted together with the analog gain Am and the electronic shutter speed.

An RGB gain setting unit 24 evaluates the evaluation values Ir, Ig and Ib, determines digital gains Dmr, Dmg and Dmb to adjust the brightness level and white balance, and assigns those to the RGB multiplier 17.

The RGB gain setting unit 24 calculates the digital gain Dmg for setting the target value Tg equal to the evaluation value Ig, the target value Tg being predetermined as a target of setting the evaluation value Ig. Also, the RGB gain setting unit 24 calculates the digital gains Dmr and Dmb for the red and blue components so as to set a ratio between the evaluation values Ir, Ig and Ib equal to a balance target value as a target of the ratio between the primary colors. In other words, the digital gains Dmr and Dmb for red and blue are determined for suitable white balance according to the digital gain Dmg for green as reference to optimize the brightness. An example of the balance target value is a value of a gray color or an achromatic color as a sum of addition of colors of all the pixels within the evaluation region.

Note that various known methods can be used for determining gains to adjust the brightness level and white balance, and determining the electronic shutter speed and the like in the master camera 3.

A combination of the image data evaluation unit 21, the analog gain setting unit 22 and the RGB gain setting unit 24 is a gain adjuster to optimize the brightness level and white balance according to the color image obtained by the master camera 3. Among the values of the gains, an analog gain Am is common between the primary colors. Digital gains Dmr, Dmg and Dmb are for the respective primary colors.

The slave camera 4 includes a lens system 35, a CCD image sensor 36, a driver 37, an AFE (analog front end) circuit 38, a timing generator (TG) 44 and a digital signal processor (DSP) 45. The AFE circuit 38 includes a correlated double sampling circuit (CDS) 41, an auto gain control circuit (AGC) 42 and an A/D converter 43. The digital signal processor 45 functions differently from the DSP of the master camera 3. However, remaining elements in the master camera 3 are equal to those of the slave camera 4.

The timing generator 44 operates in synchronism with the timing generator 14 of the master camera 3. The digital signal processor 45 sets the brightness level, white balance, electronic shutter speed of the slave camera 4 equal to those of the master camera 3. An RGB multiplier 47 effects multiplication of image data with digital gains Dsr, Dsg and Dsb to adjust the brightness level and white balance. Specifically, the RGB multiplier 47 multiplies a red component of the image data by the digital gain Dsr, a green component by the digital gain Dsg, and a blue component by the digital gain Dsb. The RGB multiplier 47 is a corrector for adjusting the white balance in the slave camera 4, and also operates with the AGC 42 to adjust the brightness level of the slave camera 4.

A digital image processor 48 processes image data from the RGB multiplier 47 in the gamma correction, edge enhancement, Y/C separation and the like in the same manner as the master camera 3. The image data output by the digital image processor 48 is stored to a recording medium or data storage successively as images from the slave camera 4.

An analog gain setting unit 52 responds to the analog gain Am from the analog gain setting unit 22 in the master camera 3, and determines an analog gain As for the slave camera 4 according to Equation 1 by use of a sensitivity coefficient α, and assigns the AGC 42 with the analog gain As.

$$As = \alpha \times Am \qquad \text{Equation 1}$$

The sensitivity coefficient α is used to compensate for a difference in the imaging sensitivity between the master and slave cameras 3 and 4. The difference is derived mainly from a difference in the sensitivity of the CCDs 6 and 36. The coefficient α is predetermined by test measurement of the sensitivity of the master camera 3 relative to that of the slave camera 4.

An electronic shutter speed generator 53 retrieves an electronic shutter speed from the electronic shutter speed generator 23 of the master camera 3, and assigns the same to the driver 37. Thus, the electronic shutter speed of the slave camera 4 is set equal to that of the master camera 3. Note that the electronic shutter speed of the master camera 3 may be predetermined and fixed. In compliance with this, the electronic shutter speed of the electronic shutter speed generator 53 can be preset equal to that of the master camera 3.

An RGB gain setting unit 54 determines digital gains Dsr, Dsg and Dsb for the slave camera 4, and assigns those to the RGB multiplier 47. The digital gains Dsr, Dsg and Dsb are calculated by the RGB gain setting unit 54 according to the values and Equations 2-4, the values including the digital gains Dmr, Dmg and Dmb from the RGB gain setting unit 24 in the master camera 3, relative sensitivity values Rm, Gm and Bm of the master camera 3 for the respective primary colors, relative sensitivity values Rs, Gs and Bs of the slave camera 4 for the respective primary colors, and the sensitivity coefficient α associated with the slave camera 4.

$$Dsr = Rm/Rs \times Dmr/\alpha \qquad \text{Equation 2}$$

$$Dsg = Gm/Gs \times Dmg/\alpha \qquad \text{Equation 3}$$

$$Dsb = Bm/Bs \times Dmb/\alpha \qquad \text{Equation 4}$$

The digital gains Dsr, Dsg and Dsb are assigned to the RGB multiplier 47, for color matching to determine the brightness level and white balance equal to those of the master camera 3 in consideration of the sensitivity of the slave camera 4 and the like. A combination of the analog gain setting unit 52 and the RGB gain setting unit 54 constitutes a gain adjuster for matching in the brightness level and white balance of the master camera 3, according to the gains of the colors determined by the master camera 3 and relative sensitivity values Rm, Gm, Bm, Rs, Gs and Bs. Among the gains for the primary colors, an analog gain As is common between the primary colors. Digital gains Dsr, Dsg and Dsb are for the respective primary colors.

A memory 61 is an EEPROM or the like of which no power is required for keeping the data, and stores various data initially in the course of the manufacture, the various data including the target value Tg, balance target value, and values of color calibration information having relative sensitivity values Rm, Gm and Bm of the master camera 3 for the respective primary colors, relative sensitivity values Rs, Gs and Rs of the slave camera 4 for the respective primary colors, and the sensitivity coefficient α associated with the slave camera 4 relative to the master camera 3.

The relative sensitivity values Rm, Gm and Bm directly or indirectly express the sensitive state of the CCD 6 in the master camera 3 regarding the primary colors. The relative sensitivity values Rs, Gs and Bs directly or indirectly express the sensitive state of the CCD 36 in the slave camera 4 regarding the primary colors. Any of examples of color calibration information of the relative sensitivity values for the primary colors may be used, which can express differences or ratios of the relative sensitivity. Of course, color calibration information can be the sensitivity values themselves for the primary colors. In the present embodiment, information of the relative sensitivity values is an average value of image data obtained by test measurement of an achromatic object.

Also, it is possible to store the alternative values in the memory 61 instead of the relative sensitivity values of the master and slave cameras 3 and 4, the alternative values including green relative sensitivity values Gm and Gs and the color ratios Rm/Gm, Bm/Gm, Rs/Gs and Bs/Gs as a ratio of the relative sensitivity values of red and blue to that of green. In combination with the alternative values, Equations 5-7 are used to determine digital gains Dsr, Dsg and Dsb.

$$Dsg = Gm/Gs \times Dmg/\alpha \quad \text{Equation 5}$$

$$Dsr = (Rm/Gm)/(Rs/Gs) \times Dmr/Dmg \times Dsg \quad \text{Equation 6}$$

$$Dsb = (Bm/Gm)/(Bs/Gs) \times Dmb/Dmg \times Dsg \quad \text{Equation 7}$$

According to Equations 2-4 and also Equations 5-7, the imaging sensitivity of the slave camera 4 for the green color as one color is set equal to that of the master camera 3 with the adjusted gain, namely with the adjusted white balance. Also, the color matching is carried out to set the ratio between the three primary colors with the imaging sensitivity of the slave camera 4 equal to that of the master camera 3. This sets the brightness level and white balance equal between the master and slave cameras 3 and 4.

Note that two separate memories may be used for the master and slave cameras 3 and 4 instead of the memory 61 in common use. A first memory for the master camera 3 can store its relative sensitivity values, target value Tg and balance target value. A second memory for the slave camera 4 can store its relative sensitivity values and the sensitivity coefficient α.

The operation of the digital signal processor 45 in the slave camera 4 is synchronized with the digital signal processor 15 in the master camera 3. When the analog gain Am or the digital gains Dmr, Dmg and Dmb are determined in the master camera 3, corresponding gains are also set in the slave camera 4 within the same frame period or in one exposure, the gains including the analog gain As or the digital gains Dsr, Dsg and Dsb. Even when the analog gain Am or the digital gains Dmr, Dmg and Dmb are determined at a time point near to the end of the frame period, the gains can be assigned within one succeeding frame period in the slave camera 4. The assigned setting in the master camera 3 can be followed by the slave camera 4 only with a delay of one frame or so.

Figure 2:
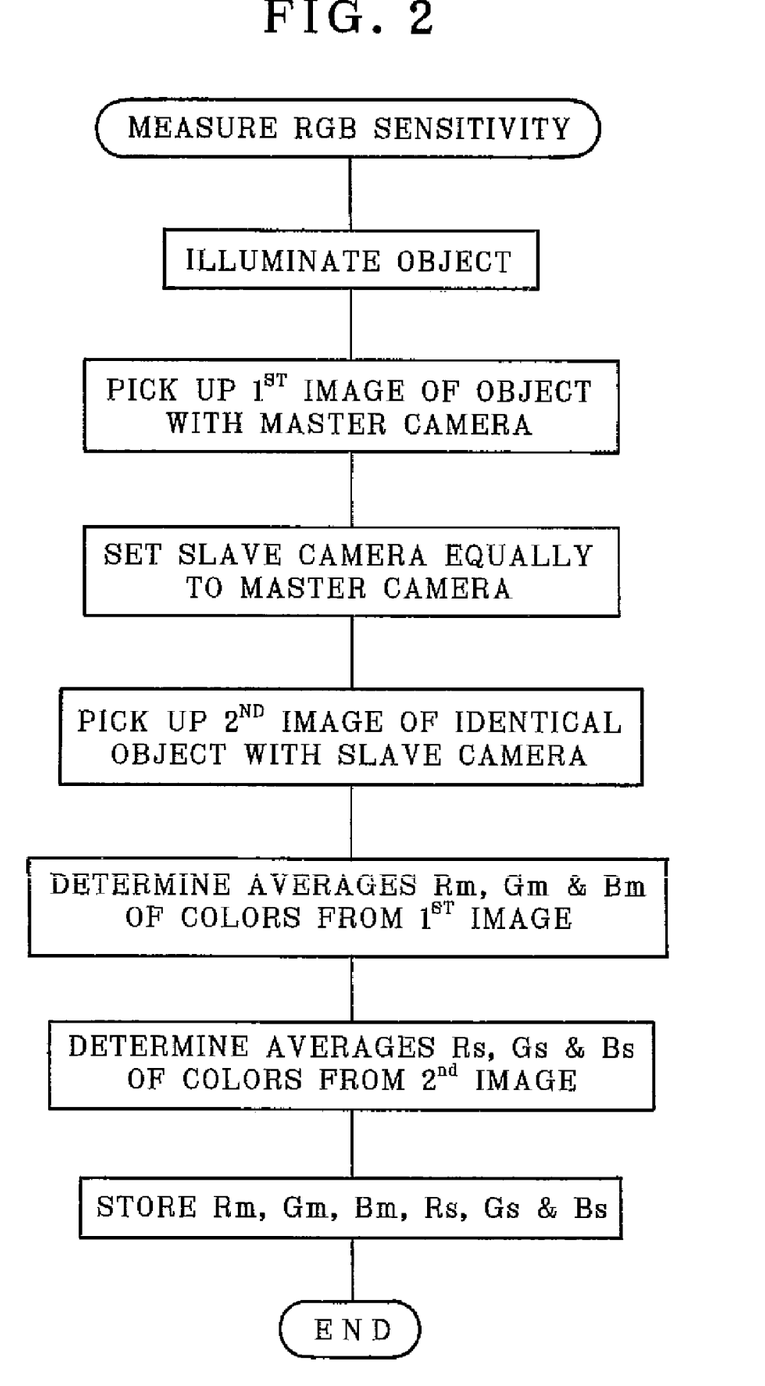
FIG. 2 is a flow chart illustrating a sequence of a test measurement of relative sensitivity values of primary colors.

In FIG. 2, a sequence of measuring the relative sensitivity values Rm, Gm, Bm, Rs, Gs and Bs is illustrated. In the measurement, the master and slave cameras 3 and 4 are used to pick up a test image of the same test object with equal illumination. An example of the test object is a gray reflector having a suitable reflectivity. A light source with a suitable color temperature is used to apply light to the gray reflector. The reflectivity, object color and color temperature may be determined in any suitable manner.

To test with the master and slave cameras 3 and 4, the slave camera 4 is positioned at the same location as the master camera 3 after the test with the master camera 3. The analog gain As of the slave camera 4 is set initially equal to the analog gain Am of the master camera 3. Digital gains Rm, Gm, Bm, Rs, Gs and Bs for the master and slave cameras 3 and 4 are set initially at an equal level. An electronic shutter speed is adjusted so as to set the highest output of each pixel of the CCDs 6 and 36 equal to or less than ⅔ of the saturation level.

After the image pickup, average values of image data of red, green and blue are determined for an image obtained by the master camera 3. The average values are the relative sensitivity values Rm, Gm and Bm for red, green and blue. Similarly, average values of image data of red, green and blue are determined for an image obtained by the slave camera 4. The average values are the relative sensitivity values Rs, Gs and Bs for red, green and blue. The relative sensitivity values Rm, Gm and Bm of the master camera 3 and the relative sensitivity values Rs, Gs and Bs of the slave camera 4 are written to the memory 61. Note that the relative sensitivity value Gm of the master camera 3 may be one (1) as a reference value. The relative sensitivity values Rm and Bm and the relative sensitivity values Rs, Gs and Bs may be expressed as a multiple or factor of the relative sensitivity value Gm.

The operation of the embodiment is described now. In the manufacture of the stereoscopic camera 2, the relative sensitivity values Rm, Gm and Bm for the master camera 3 and those Rs, Gs and Bs for the slave camera 4 are measured according to the sequence in FIG. 2. The target value Tg, the balance target value, and the sensitivity coefficient α of the slave camera 4 are written to the memory 61 together with the relative sensitivity values.

During the image pickup in the stereoscopic camera 2, the master and slave cameras 3 and 4 operate for image pickup in synchronism at an equal frame rate. The CCD 6 in the master camera 3 takes exposures consecutively by taking one exposure per one frame period. An object image of one frame of one exposure is output as an analog image signal from the CCD 6 in a succeeding frame period. The analog image signal is sent through the CDS 11 to the AGC 12. The analog gain Am is assigned to the AGC 12 as amplifier. The analog image signal is amplified with the analog gain Am, and then is converted by the A/D converter 13 into digital image data.

Digital image data from the A/D converter 13 is input to the RGB multiplier 17, and is multiplied by the digital gains Dmr, Dmg and Dmb assigned in the RGB multiplier 17. A red component of the image data is multiplied by the digital gain Dmr. A green component is multiplied by the digital gain Dmg. A blue component is multiplied by the digital gain Dmb. The components of the image data as products are processed by the digital image processor 18 for gamma correction, edge enhancement and Y/C separation, so that processed image data is output by the master camera 3.

Similarly, the slave camera 4 outputs an analog image signal each time that the CCD 36 takes one exposure. The analog image signal is sent through the CDS 41 to the AGC 42 as amplifier. The analog image signal is amplified with the analog gain As assigned in the AGC 42, and is converted by the A/D converter 43 into image data of the three primary colors. The RGB multiplier 47 multiplies the digital image data by respectively the digital gains Dsr, Dsg and Dsb. Then the digital image data is processed by the digital image processor 48 for image processing of various settings, and then is output.

At the same time as the processing of three-color image data in the RGB multipliers 17 and 47 and the digital image processors 18 and 48, the master camera 3 determines the analog gain Am and the digital gains Dmr, Dmg and Drb according to the three-color image data. The slave camera 4 determines the analog gain As and the digital gains Dsr, Dsg and Dsb according to the analog gain Am and the digital gains Dmr, Dmg and Dmb.

Figure 3:
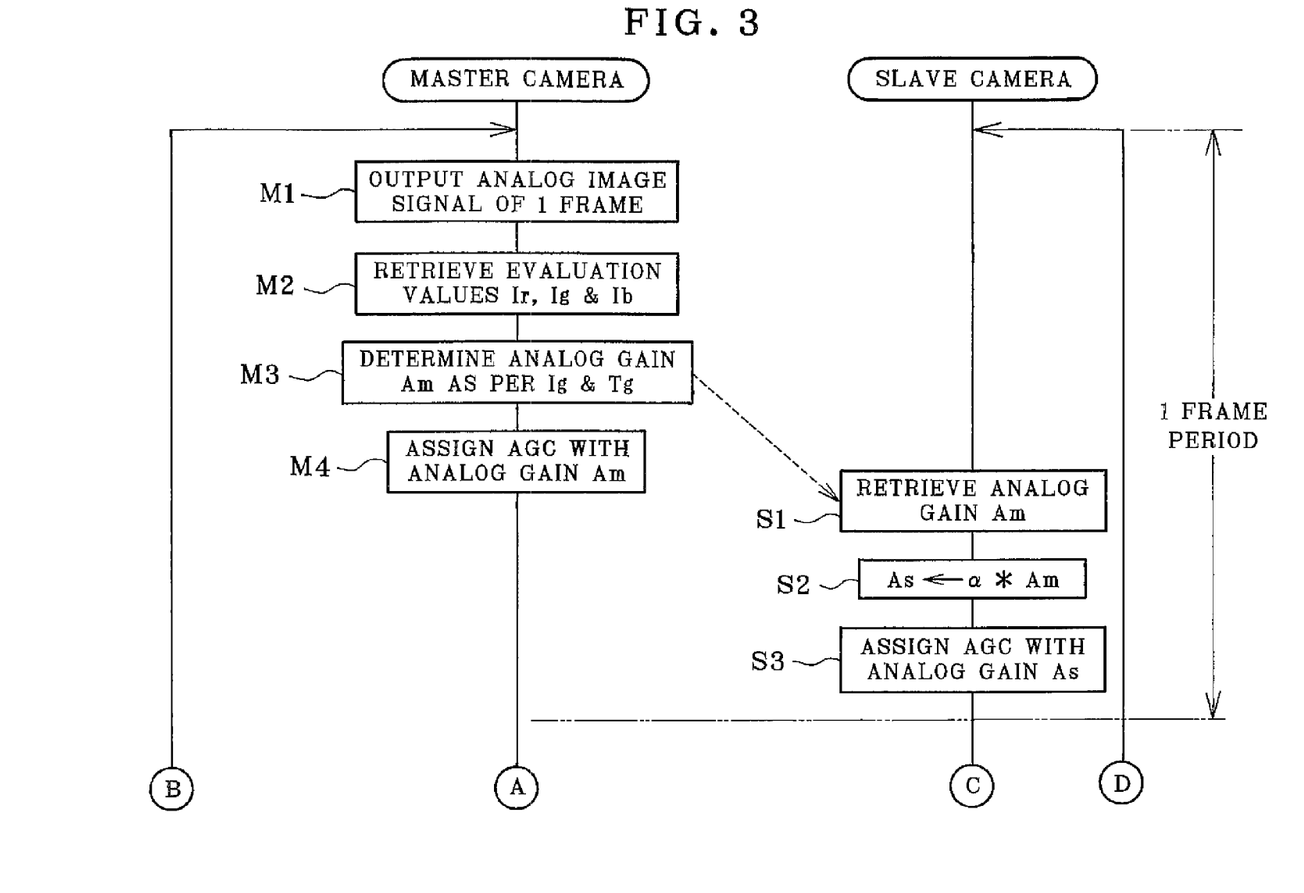
FIGS. 3 and 4 are a flow chart illustrating a sequence of determining gains to adjust image signals.
Figure 4:
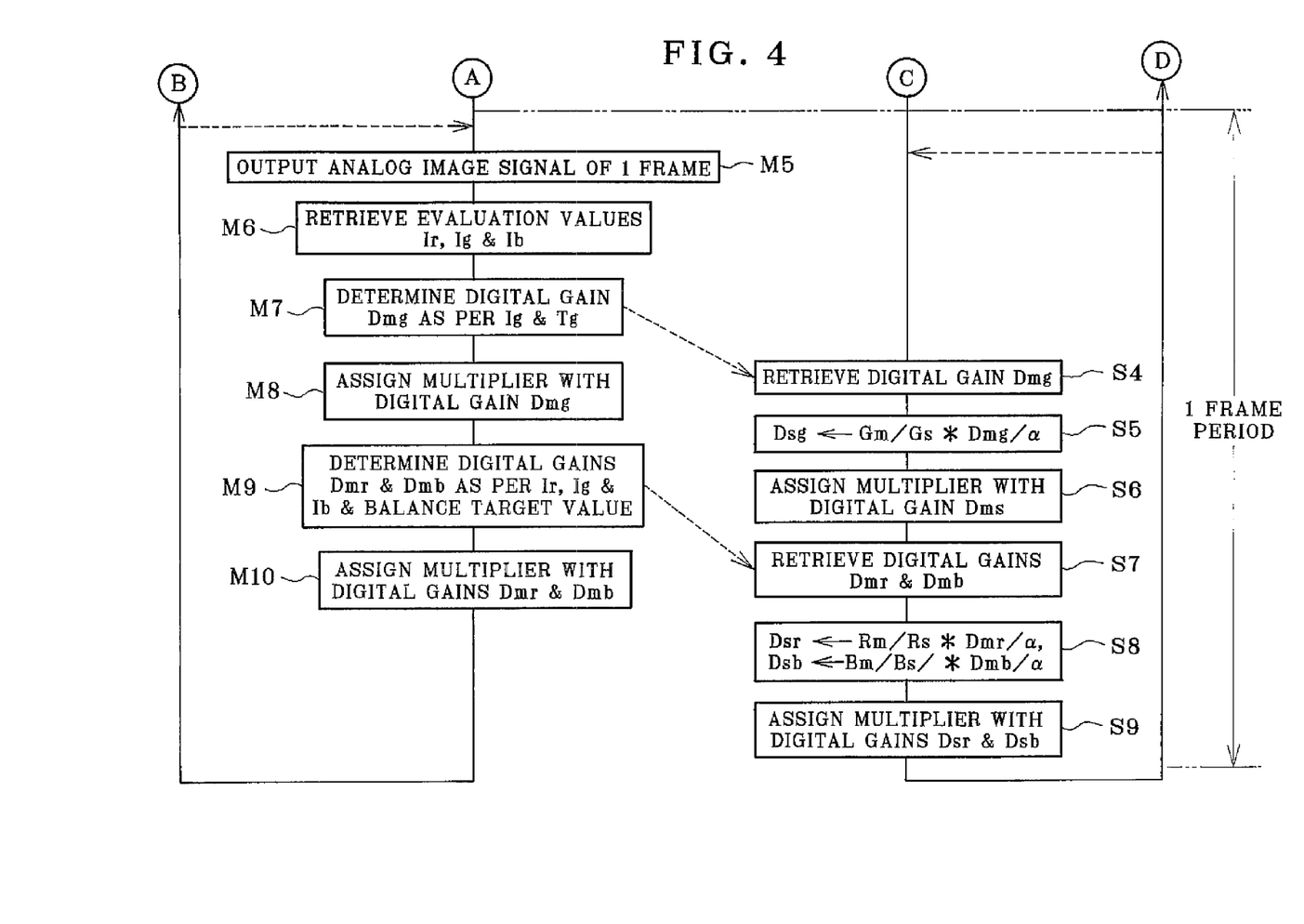

In FIGS. 3 and 4, the CCD 6 outputs an analog image signal in the Nth frame period at the step M1 as a result of the (N−1)th frame period. Image data obtained by converting the analog image signal is input to the RGB multiplier 17 and also to the image data evaluation unit 21. At the step M2, the image data evaluation unit 21 determines the red, green and blue evaluation values Ir, Ig and Ib. In the Nth frame period, only the green evaluation value Ig is input to the analog gain setting unit 22.

The target value Tg is read from the memory 61 initially, and assigned in the analog gain setting unit 22. When the evaluation value Ig is input, the analog gain setting unit 22 compares the evaluation value Ig with the target value Tq, and calculates a new analog gain Am at the step M3. Then the analog gain setting unit 22 assigns the analog gain Am in the AGC 12 at the step M4. To be precise, the analog gain Am is determined by minimizing a difference between the evaluation value Ig and the target value Tg for the green.

The analog gain Am obtained at the step M3 is retrieved by the analog gain setting unit 52 in the slave camera 4 at the step S1. Then the analog gain setting unit 52 determines the analog gain As according to Equation 1 at the step S2 by use of the analog gain Am and the sensitivity coefficient α retrieved from the memory 61. The analog gain As is assigned to the AGC 42 at the step S3.

The analog gains Am and As determined in the Nth frame period are effective in the (N+1)th frame period. An analog image signal as a result of exposure in the Nth frame period is output in the (N+1)th frame period by the CCD 6 at the step M5. As the analog gain Am is assigned to the AGC 12 as a value obtained in the Nth frame period, the analog image signal is amplified with the analog gain Am, and is converted by the A/D converter 13 digitally into image data.

At the step M6, the image data evaluation unit 21 determines red, green and blue evaluation values Ir, Ig and Ib according to image data from the A/D converter 13, and inputs those to the RGB gain setting unit 24.

According to the target value Tg and the evaluation value Ig read from the memory 61, the RGB gain setting unit 24 calculates a digital gain Dmg at the step M7 so as to set the succeeding evaluation value Ig equal to the green target value Tg. The RGB gain setting unit 24 assigns the digital gain Dmg in the RGB multiplier 17 at the step M8. Therefore, the digital gain Dmg is set together with the analog gain Am so as to optimize the brightness level.

After the digital gain Dmg is determined, the RGB gain setting unit 24 determines red and blue digital gains Dmr and Dmb at the step M9 to optimize the white balance according to the balance target value from the memory 61 and the evaluation values Ir, Ig and Ib. The red and blue digital gains Dmr and Dmb are assigned to the RGB multiplier 17 at the step M10.

At the step S4, the digital gain Dmg determined by the master camera 3 is retrieved by the RGB gain setting unit 54 in the slave camera 4. At the step S5, the digital gain Dmg and the color calibration information including the relative sensitivity value Gm of the master camera 3, the relative sensitivity value Gs of the slave camera 4, and the sensitivity coefficient α are arithmetically processed in Equation 3, to determine a digital gain Dsg. At the step S6, the digital gain Dsg is assigned to the RGB multiplier 47.

At the step S7, the digital gains Dmr and Dmb from the master camera 3 are retrieved by the RGB gain setting unit 54 in the slave camera 4. At the step S8, the digital gains Dsr and Dsb for the slave camera 4 are determined according to Equations 2 and 4. The digital gains Dsr and Dsb are assigned to the RGB multiplier 47 at the step S9. To determine the digital gains Dsr and Dsb with Equations 2 and 4, the digital gains Dmr and Dmb from the master camera 3 and the color calibration information from the memory 61, namely the relative sensitivity values Rm and Bm read for the master camera 3, the relative sensitivity values Rs and Bs for the slave camera 4 and the sensitivity coefficient α, are used.

The digital gain determined for the master and slave cameras 3 and 4 in the (N+1)th frame period is effective in the (N+2)th frame period. An analog image signal as a result of exposure in the (N+1)th frame period is output by the CCD 6 in the (N+2)th frame period. The analog image signal is amplified by the AGC 12 with the analog gain Am determined in the Nth frame period, and is converted by the A/D converter 13 into digital image data. The RGB multiplier 17 multiplies the digital image data by the digital gains Dmr, Dmg and Dmb determined in the (N+1)th frame period, before the multiplied image data is sent to the digital image processor 18.

Similarly, the CCD 36 outputs an analog image signal as a result of exposure in the (N+1)th frame period. The analog image signal is amplified by the AGC 42 with the analog gain As obtained in the Nth frame period. The RGB multiplier 47 multiplies the digital image data from the A/D converter 43 by the digital gains Dsr, Dsg and Dsb obtained in the (N+1)th frame period. The multiplied image data are input to the digital image processor 48.

In the (N+2)th frame period, the master camera 3 determines the analog gain Am in the similar manner to the Nth frame period. In the slave camera 4, the analog gain As is determined according to the analog gain Am. In the (N+3)th frame period, the master camera 3 determines the digital gains Dmr, Dmg and Dmb in the similar manner to the (N+1)th frame period. In the slave camera 4, the digital gains Dsr, Dsg and Dsb are determined according to the digital gains Dmr, Dmq and Dmb. Similarly, image pickup is continued by repeating the sequence of determining the analog gain and digital gains.

It is also possible as illustrated in FIGS. 3 and 4 to perform a task of adjusting a digital gain at the step M5 at one or more times after the task of the step M1 in the master camera 3. Then the operation can turn to the step M1 to perform the task of adjusting the analog gain Am. For the event of plural times of adjusting the digital gain consecutively, the digital gain in the slave camera 4 is also adjusted at plural times consecutively.

This being so, the master camera 3 regulates the brightness level and white balance suitably by following changes in the object brightness or light from a light source. Simultaneously, the slave camera 4 is adjusted in the color matching to maintain the brightness level and white balance equal to those of the master camera 3. A brightness level and color balance of images picked up by the master and slave cameras 3 and 4 are constantly equal even upon changes in a scene to photograph. A stereoscopic image can be observed without en error in relation to the appearance. Also, for the master and slave cameras 3 and 4 to measure a distance of a scene of image pickup, it is possible to suppress occurrence of failure in calculating the correlation of an object in each image. The distance can be measured continuously without a break, because the brightness level and white balance of the image are equal between the master and slave cameras 3 and 4.

Note that a multi-eye image pickup apparatus of the invention may be a camera with plural camera heads for photographing plural portions in a scene. It is possible between the camera heads to set equal the brightness level and color balance of images. An object moving between regions of image pickup of the camera heads can be recognized easily and tracked automatically.

In the above embodiments, the slave camera 4 as the auxiliary image pickup assembly is single. However, two or more auxiliary image pickup assemblies can be combined with the main image pickup assembly for purposes of a multi-eye image pickup apparatus. Also, the auxiliary image pickup assembly can be interchangeable with the main image pickup assembly. The main and auxiliary image pickup assemblies in a combination may be changed over between the main and auxiliary statuses.

It is important to change the analog gain and digital gains within a difference of one or two frames between the master and slave cameras 3 and 4. However, it is possible to set a delay of 5-10 frames or so between the master and slave cameras 3 and 4 to change the analog gain and digital gains with a time constant. This is effective in preventing abrupt changes in a change between scenes.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A multi-eye image pickup apparatus, including a first image pickup assembly having a first image sensor for photoelectric conversion of object light to generate a first image signal with plural color components, and at least one second image pickup assembly having a second image sensor for photoelectric conversion of said object light to generate a second image signal with plural color components, said multi-eye image pickup apparatus comprising:
   a memory for storing color calibration information defined in association with color sensitivity of said first and second image sensors for said plural color components;
   a first corrector for adjusting said first image signal for respectively said plural color components, to correct a brightness level and white balance;
   a second corrector for adjusting said second image signal for respectively said plural color components, to correct a brightness level and white balance;
   a first gain setting unit for determining a first gain according to said first image signal, and for assigning said first corrector therewith; and
   a second gain setting unit for determining a second gain according to said first gain and said color calibration information, and for assigning said second corrector therewith, to set equal said brightness level and said white balance between said first and second image signals.

2. A multi-eye image pickup apparatus as defined in claim 1, wherein said second gain setting unit assigns said second gain in synchronism with assignment of said first gain by said first gain setting unit.

3. A multi-eye image pickup apparatus as defined in claim 2, further comprising:
   a first amplifier for amplifying said first image signal between said first image sensor and said first corrector, to correct a brightness level thereof;
   a second amplifier for amplifying said second image signal between said second image sensor and said second corrector, to correct a brightness level thereof;
   a third gain setting unit for determining a third gain according to said first image signal, to assign said first amplifier with said third gain; and
   a fourth gain setting unit for determining a fourth gain according to said third gain, to assign said second amplifier with said fourth gain.

4. A multi-eye image pickup apparatus as defined in claim 3, wherein said first and second gain setting units assign said first and second gains in a frame period after said third and fourth gain setting units assign said third and fourth gains.

5. A multi-eye image pickup apparatus as defined in claim 1, wherein said color calibration information is predetermined by image pickup of one test object with said first and second image pickup assemblies in a common measuring condition.

6. A multi-eye image pickup apparatus as defined in claim 5, wherein said color calibration information is constituted by a relative sensitivity value of a green color of colors of said plural color components, and a ratio of a relative sensitivity value of red and blue colors to said relative sensitivity value of said green color for each of said first and second image pickup assemblies.

7. A multi-eye image pickup apparatus as defined in claim 5, wherein said color calibration information is constituted by a ratio of a relative sensitivity value of said first image pickup assembly to a relative sensitivity value of said second image pickup assembly for respectively said plural color components, and said first gain is multiplied by said ratio to determine said second gain.

8. An adjusting method of adjusting a multi-eye image pickup apparatus including a first image pickup assembly for photoelectric conversion of object light to generate a first image signal with plural color components, and at least one second image pickup assembly for photoelectric conversion of said object light to generate a second image signal with plural color components, said adjusting method comprising steps of:
   determining a first gain of said plural color components according to said first image signal to correct a brightness level and white balance of said first image pickup assembly, to adjust said first image signal by use thereof; and determining a second gain of said plural color components according to said first gain and color calibration information predetermined according to color sensitivity of said first and second image pickup assemblies in relation to said plural color components, to adjust said second image signal by use thereof, for color matching between said first and second image signals to set equal said brightness level and said white balance.

9. An adjusting method as defined in claim 8, wherein said second gain is assigned in said second image pickup assembly in synchronism with assignment of said first gain in said first image pickup assembly.

10. An adjusting method as defined in claim 9, further comprising steps of:
- before adjusting said first image signal with said first gain, amplifying said first image signal with a third gain determined according to said first image signal, to correct said brightness level thereof;
- before adjusting said second image signal with said second gain, amplifying said second image signal with a fourth gain determined according to said third gain, to correct said brightness level thereof.

11. An adjusting method as defined in claim 10, wherein said first and second gains are assigned in a frame period after said third and fourth gains are assigned.

12. An adjusting method as defined in claim 8, wherein said color calibration information is predetermined by image pickup of one test object with said first and second image pickup assemblies in a common measuring condition.

13. An adjusting method as defined in claim 12, wherein said color calibration information is constituted by a relative sensitivity value of a green color of colors of said plural color components, and a ratio of a relative sensitivity value of red and blue colors to said relative sensitivity value of said green color for each of said first and second image pickup assemblies.

14. An adjusting method as defined in claim 12, wherein said color calibration information is constituted by a ratio of a relative sensitivity value of said first image pickup assembly to a relative sensitivity value of said second image pickup assembly for respectively said plural color components, and said first gain is multiplied by said ratio to determine said second gain.

* * * * *